United States Patent
Thordarson et al.

(10) Patent No.: US 6,392,586 B1
(45) Date of Patent: May 21, 2002

(54) CAR RADAR TESTING

(75) Inventors: Gunnar Thordarson, Jarfalla; Ingemar Bäck, Akersberga, both of (SE)

(73) Assignee: Celsiustech Electronics AB, Jarfalla (SE)

( * ) Notice: Subject to any disclaimer, the term of this patent is extended or adjusted under 35 U.S.C. 154(b) by 0 days.

(21) Appl. No.: 09/529,732

(22) PCT Filed: Oct. 20, 1998

(86) PCT No.: PCT/SE98/01879

§ 371 Date: Jun. 28, 2000

§ 102(e) Date: Jun. 28, 2000

(87) PCT Pub. No.: WO99/21029

PCT Pub. Date: Apr. 29, 1999

(30) Foreign Application Priority Data

Oct. 21, 1997 (SE) ................................................ 9703837

(51) Int. Cl.$^7$ ................................................ G01S 7/40
(52) U.S. Cl. ...................... 342/169; 342/170; 342/171; 342/173; 342/174
(58) Field of Search ................................ 342/165, 169, 342/170, 171, 172, 173, 174

(56) References Cited

U.S. PATENT DOCUMENTS

| | | | |
|---|---|---|---|
| 2,825,058 A | | 2/1958 | Rix et al. |
| 3,449,746 A | | 6/1969 | Begeman et al. |
| 3,832,712 A | * | 8/1974 | Goetz et al. ................. 342/168 |
| 4,969,819 A | * | 11/1990 | Wilbur ........................... 434/5 |
| 5,036,479 A | * | 7/1991 | Prednis et al. ............... 702/121 |
| 5,093,656 A | | 3/1992 | Dipoala ....................... 340/522 |
| 5,117,230 A | * | 5/1992 | Wedel, Jr. .................... 342/169 |
| 5,247,843 A | * | 9/1993 | Bryan ......................... 73/865.6 |
| 5,534,873 A | * | 7/1996 | Weichman et al. .......... 342/165 |
| 5,821,897 A | * | 10/1998 | Bradley ....................... 342/165 |
| 5,920,281 A | * | 7/1999 | Grace .......................... 342/165 |
| 6,087,995 A | * | 7/2000 | Grace et al. ................. 343/703 |
| 6,114,985 A | * | 9/2000 | Russell et al. .............. 342/169 |

* cited by examiner

Primary Examiner—John B. Sotomayor
(74) Attorney, Agent, or Firm—Connolly Bove Lodge & Hutz, LLP

(57) ABSTRACT

A method and device for testing the function of a radar. A diode (21) with variable radar radiation impedance is arranged in the beam path (23) inside the antenna unit (4, 6) of the car radar and is fed with alternating current for simulating a radar target at a distance from the antenna unit. The obtained target data for the simulated target are compared to the expected target data for testing the function.

20 Claims, 3 Drawing Sheets

CAR RADAR TESTING

FIELD OF THE INVENTION

The present invention relates to the testing or monitoring of the function of a car radar.

BACKGROUND ART

In car radar systems, it is important to be able to test or monitor the function of the system during operation. It is relatively easy to test interior electric functions, e.g. by applying a test signal instead of the signal from the transceiver antenna unit of the car radar and evaluating the response of the system to this signal. However, testing of the actual transceiver antenna unit requires sophisticated testing equipment, which is placed separately in front of the car radar.

OBJECT OF THE INVENTION

The object of the present invention is to provide a possibility of testing or monitoring a car radar, preferably of FMCW type, and in particular its transceiver antenna unit in a simplified and at the same time efficient way.

SUMMARY OF THE INVENTION

According to the invention, the above-mentioned object is achieved by a method, device and use having the features stated in the accompanying claims.

The basis of the invention is thus the understanding that it is advantageous to create opportunities for the desired testing inside the actual transceiver antenna unit. By exerting in a controlled manner an influence on the radar radiation in the actual beam path in the unit, i.e. in the beam path after the radar beam has left the microwave feeder of the unit, such as a horn, but before the radar beam leaves the unit, it is possible to generate reflected radar signals corresponding to a simulated target, which is located at a certain distance from the antenna unit. An evaluation of such simulated target signals results in target data, which can be related to target data, which can be expected in response to the tested, controlled influence on the radar radiation. As will be understood, a possible error function will easily be detectable, e.g. in the form of a deficient correspondence between the obtained simulated target data and the corresponding expected target data. The latter can be calculated or determined empirically.

According to the invention, said radar radiation influence can advantageously comprise the provision of a local radar radiation reflection in the unit with distinctly altered microwave parameters in relation to the normal reflection in the unit, in particular as concerns amplitude and preferably also phase when an FMCW radar is used.

According to a preferred embodiment of the invention, said controlled influence comprises the step of locally altering in the unit the impedance of a reflecting part to the radar radiation. The obtained alteration of the impedance will result in detectable signal variations in the receiver member of the car radar system, which variations can be evaluated as simulated target data.

In a preferred embodiment of the invention an FMCW radar is used, in particular with an antenna of the so-called Cassegrain type, with a fixed subreflector and a movable main reflector. The antenna unit of the radar transmits a radar signal, which is frequency-modulated, i.e. its frequency is varied linearly over time. The received, reflected radar signal is mixed with the transmitted one, resulting in a difference frequency. The latter is a measure of the time delay of the received signal and thus of the distance to a reflecting target. For signals that are normally reflected from the inside of the antenna unit, the time of propagation is so short that the difference frequency is zero in practical application.

By placing, in the beam path of the antenna unit, a reflecting part with a variable radar radiation impedance and influencing this impedance in a controlled manner, it is possible to influence the signal received in the antenna unit both as concerns phase and amplitude, hence simulating a target at a distance from the antenna unit. The resulting effect will be dependent on both the impedance variation of said part (resistive and reactive) and the exact positioning of said part in relation to the reference plane of the receiver in the antenna unit. As an example of the latter it can be mentioned that in a car radar system, which is operating with a wavelength of 4 mm, a displacement of said part with variable impedance by 0.5 mm will result in a rotation through 90° of the resulting experienced modulation. In a corresponding manner, the experienced modulation will shift phase if the wave propagation in the antenna unit is changed. The latter is the case when the antenna unit contains a movable reflector element. This situation can then be used to check, when evaluating the simulated target signal, whether the reflector element moves correctly.

According to a preferred embodiment of the invention, the impedance variation of said part is modulated with a frequency corresponding to the difference frequency of a simulated target. The radar system will perceive this as there being a target at a corresponding distance from the antenna unit. By varying the modulating frequency, the simulated target can be moved to various distances. Likewise, targets of different intensity can be simulated by varying the modulation in respect of amplitude.

The reflecting part with variable radar radiation impedance is preferably a diode means. Its impedance can easily be varied by conducting an alternating current through the same. The radar radiation reaching the diode means will be reflected in different ways depending on the impedance of the diode means. In the radar receiver, this will be experienced as a variable target. The frequency of the alternating current can be selected such that it corresponds to the difference frequency of a simulated target, which is located at a certain distance of interest.

The diode means is preferably of the so-called PIN diode type. The diode means can be mounted on a printed circuit board, on which electronics associated with the antenna unit are mounted. With a view to improving the connection between the diode means and the microwave radiation incident on the same, it can be advantageous to use an extra coupling element in connection with the diode element. This coupling element can be can be formed as a conductive pattern in the printed circuit board tuned to the microwave frequency, or alternatively as a mechanical element, which is tuned to the microwave frequency, is mounted on the printed circuit board and has a certain vertical extent above the printed circuit board. Such an element can typically have a dimension in the order of 1 to 4 mm.

The invention makes it possible at a very reduced cost to easily solve the problems of testing a car radar system, at the same time as a number of advantages are achieved:

An overall testing of the transmitter, receiver and antenna (including the movements of the antenna) is made possible without exterior equipment;

It is an incorporated testing device which is an integrated part of the system;

Very few and cheap extra components are needed;

The testing device can be permanently present with-out disturbing the ordinary function;

Below the invention will be described in more detail by means of an embodiment and with reference to the accompanying drawings.

DESCRIPTION OF AN EMBODIMENT

Figure 1:
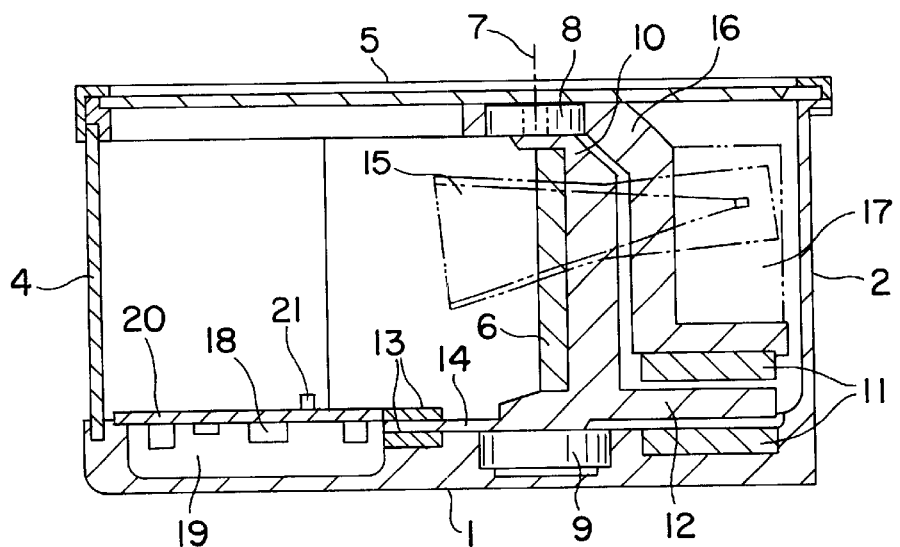
FIG. 1 is schematic view in cross-section of an embodiment of an antenna unit of a car radar including the present invention.
Figure 2:
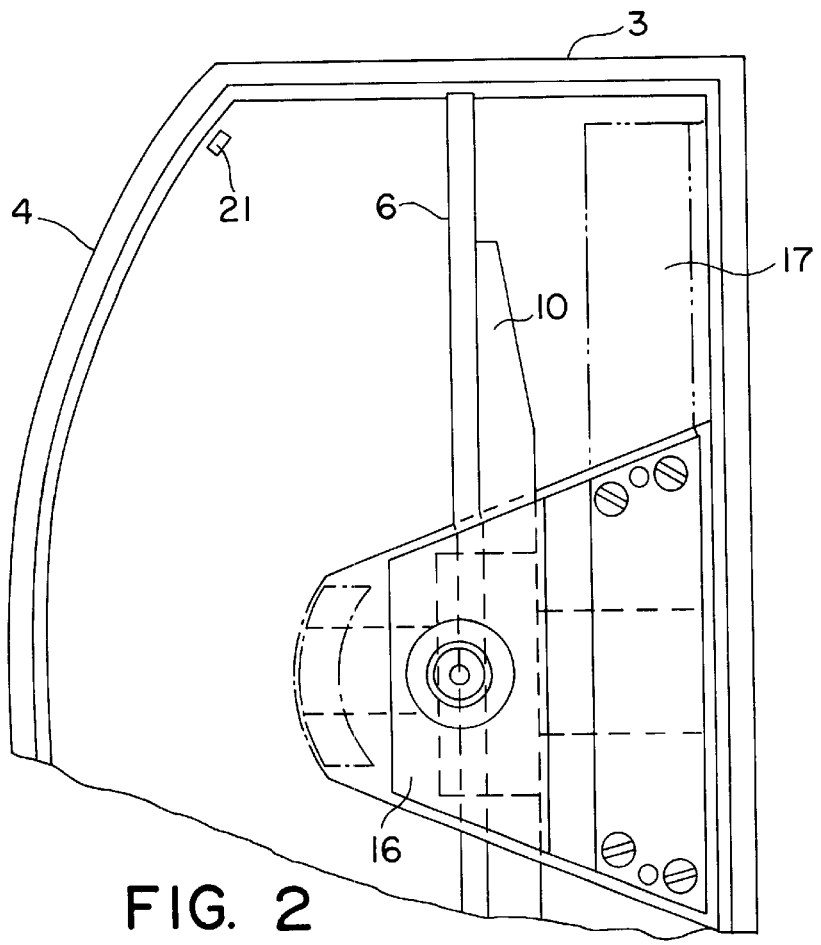
FIG. 2 is a partial top view of the antenna unit in FIG. 1, the cover being removed.

In FIGS. 1 and 2, an example of an antenna unit of a car radar is illustrated, which unit is provided with a reflection means with variable radar radiation impedance according to the present invention. The antenna unit is of the Cassegrain type.

The antenna unit is defined by a box-like housing including a bottom portion 1 with side walls 2, 3, an arched front portion 4 constituting radome and subreflector, and a cover 5. A reflector 6 is pivotably arranged about an axis 7 through a carrier means 10, which is mounted on each side of the reflector in bearings 8, 9 of e.g. ball-bearing type or another suitable form of bearing. The reflector 6 is pivoted about the axis 7 by means of a driving motor consisting of a fixed motor portion 11 and a movable motor portion or rotor 12. The pivoting of the reflector is sensed by a tachometer with a fixed portion 13 and a movable portion or rotor 14. A fixed microwave feeder 15 in the form of a horn is supported by a support element 16 arranged between the driving motor and the bearing 8. In connection with the support element, the microwave unit 17 of the antenna unit is also contained. In the bottom portion 1 of the housing, there is also a space 19 for electronics 18. The electronics are mounted at the underside of a printed circuit board 20.

During operation, a radar signal is transmitted in the microwave range via the feeder 15. The signal is reflected against the subreflector 4 back towards the reflector 6. The reflector 6 reflects the signal towards the subreflector 4, which this time transmits the signal because the polarisation of the signal has changed during the reflection process from the moment the signal is reflected against the subreflector (see FIG. 3). A signal incident on the radar device follows the same sequence as the transmitted signal but in the opposite order. By pivoting the reflector 6 back and forth about the pivot axis 7 by means of a driving motor 11, 12, the radar beam can be made to sweep within an angular range which is determined by the pivotal motion of the reflector in association with the subreflector 4. The tachometer 13, 14 monitors the pivoting of the reflector and controls the driving motor 11, 12 via a servo mechanism (not shown) to operate within a determined sweep frequency.

The antenna unit is described in more detail in the document WO 96/36088, to which reference is made as regards further construction details.

A reflection means with variable impedance in the form of a diode 21 is mounted on the upper side of the printed circuit board 20 near one of the lower end portions of the subreflector 4. The diode 21, as well as its driving means, which is described in association with FIG. 4, can as will be understood very easily be integrated in the electronics 18.

Figure 3:
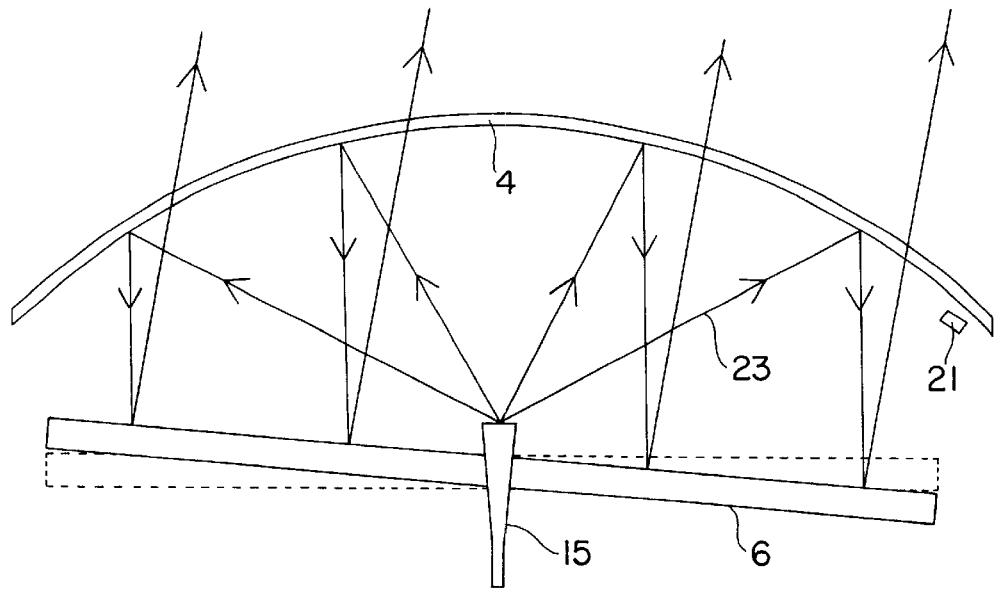
FIG. 3 is a schematic top view illustrating the beam path in an antenna unit according to FIGS. 1 and 2.

As will be apparent from FIG. 3, which schematically shows the beam path in the antenna unit, the diode 21 will be placed in the fringe area of the beam path range and not disturb the normal operation. The diode will, however, be reached by part of the radiation leaving the horn 15.

In the shown embodiment, the main reflector 6 is, as mentioned, movable. When this reflector is pivoted, the total beam path to the diode 21 will be changed, which implies that the resulting phase position of the signal, which is received due to the reflection of the diode, will also be changed. Hence it will be possible to test the motion of the reflector, as will be apparent.

Figure 4:
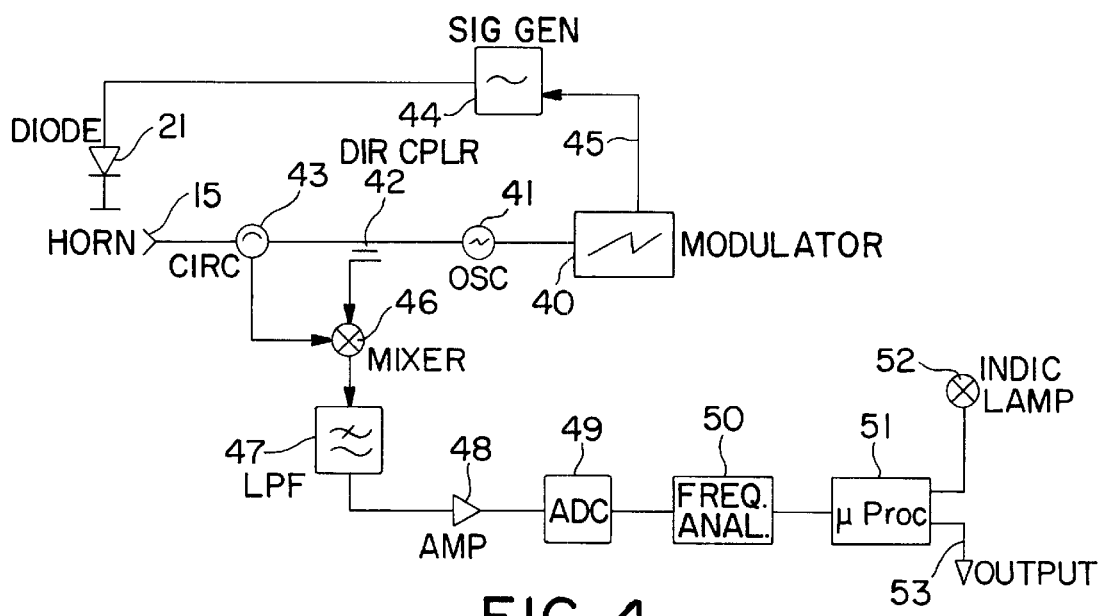
FIG. 4 is a block diagram of a car radar system including an embodiment of the present invention.

In FIG. 4, a block diagram is shown of an embodiment of a car radar system, which includes the present invention. An oscillator 41 generates a microwave signal, whose frequency is typically 77 GHz. This signal is fed via a directional coupler 42 and a circulator 43 to the horn 15 of the antenna unit. The oscillator 41 is frequency-modulated by a modulator 40. The modulator feeds a control signal to the oscillator so that the latter changes its frequency periodically linearly between two values, whereby the desired radar frequency sweep is obtained.

The diode 21 located in the beam path of the antenna unit is fed with alternating current from a signal generator 44. The frequency of the obtained alternating current modulation of the diode 21 can typically be 200 kHz. The signal generator 44 is synchronised with the frequency sweep via a line 45 from the frequency modulator 40.

Reflected radar signals, which are received by the horn 15, are fed via the circulator 43 to a mixer 46, where they are mixed with the signal obtained from and transmitted by the directional coupler 42. The obtained difference frequency signal is low-pass filtered in a filter 47. The filtered signal is amplified in an amplifier 48. The amplified signal is converted from analogue to digital in an A/D converter 49 and subsequently fed to a frequency analyser 50 for FFT (Fast Fourier Transform)—spectrum calculation. Further conventional processing of the obtained results is performed in a microprocessor 51, where radar target data are compiled and evaluated. When the evaluation, in connection with the functional testing, indicates an error function, a signal is emitted, e.g. by means of an indicator lamp 52. During normal operation, the microprocessor 51 feeds target data information on an output line 53 for conventional use.

After the FFT circuit 50, a data set is obtained which corresponds to the spectrum of the signal after the low-pass filter 47. It consists of a complex number for each frequency. When the frequency of the signal generator 44 is altered, a corresponding alteration occurs in the spectrum.

After the FFT calculation, the amplitude and phase are thus determined for the frequency component which corresponds to the frequency of the signal generator. This is repeated for each radar frequency sweep.

Figure 5:
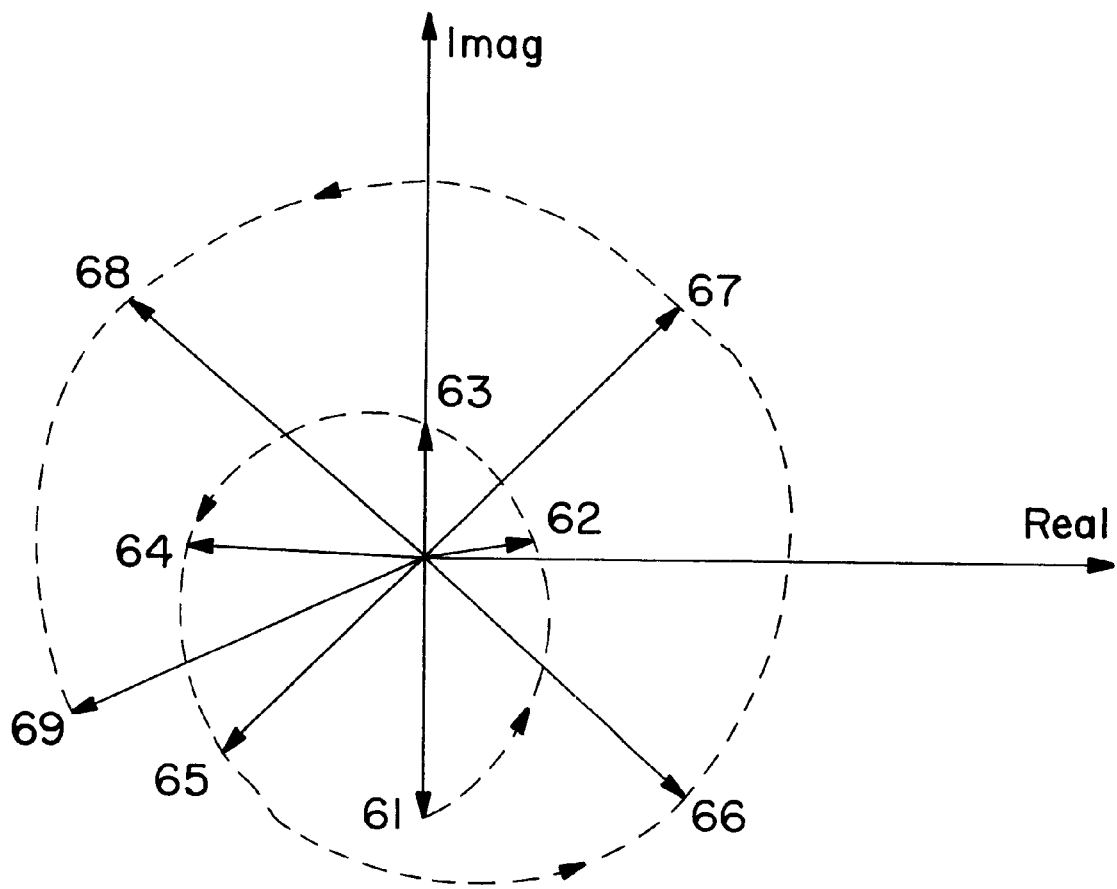
FIG. 5 is a schematic diagram illustrating a target data sequence in functional testing during an antenna sweep.

As already described, the main reflector 6 performs a periodic pivotal motion back and forth, which results in an antenna sweep. During each antenna sweep, a plurality of radar frequency sweeps are passed. In connection with the functional testing, the diode 21 is modulated during a selected antenna sweep, and an FFT calculation and evaluation are made for each radar frequency sweep. When the main reflector is pivoted from one of its end positions to the other, the above-mentioned complex number will vary, i.e.

the spectral component for the modulation component of the diode will change phase and amplitude in direct correspondence to the pivoting angle of the main reflector. In FIG. 5, such a sequence is schematically illustrated. In the Figure, each arrow 61, 62, . . . 69 corresponds to a certain angle of the main reflector. It will be obvious that an evaluation in the micro-processor 51 of said sequence in relation to, for instance, a previously stored and expected sequence gives an easy possibility of testing the pivotal motion of the reflector as well as the entire signal path of the radar system including transmitter, receiver and antenna.

The invention is not, of course, limited to the embodiment described, and changes and modifications are possible within the scope of the appended claims.

What is claimed is:

1. A method for testing the function of a car radar of FMCW type, comprising:
    simulating, in an actual beam path located in a transceiver antenna unit of the car radar, a target located at a distance from the unit;
    controlling an influence on the radar radiation of said actual beam path therein; and
    evaluating, in the car radar, the simulated target data.

2. A method according to claim 1, wherein said evaluating comprises making a comparison between the obtained target data for the simulated target and predetermined target data corresponding to said controlled influence.

3. A method according to claim 1 wherein said controlling an influence comprises the step of locally providing, in the unit, a radar radiation reflection with an altered amplitude and phase in relation to an ordinary reflection received in the unit.

4. A method according to claim 1, wherein said controlling an influence comprises the step of locally altering, in the unit, an impedance of a reflecting part of the radar radiation.

5. A method according to claim 4, wherein said altering is periodic with a frequency corresponding to a distance of the simulated target.

6. A method according to claim 5, further comprising varying the frequency to simulate targets at various distances.

7. A method according to claim 5 further comprising varying a magnitude of the impedance alteration to simulate targets having different intensities.

8. A method for testing the function of a car radar of FMCW type, comprising:
    providing in a controlled manner in an actual beam path located in a transceiver antenna unit of the car radar, a radar radiation influence,
    wherein a reflected radar signal is obtained which represents a simulated target located at a distance from the unit and which corresponds to said controlled radar radiation influence;
    evaluating the thus-obtained simulated target signal; and
    relating the obtained simulated target data to expected target data corresponding to the controlled radar radiation influence.

9. A method according to claim 8, further comprising:
    arranging, in said actual beam path, a controllable radar radiation impedance;
    wherein controlling said radar radiation influence includes controlling said controllable radar radiation impedance to provide a radar radiation reflection corresponding to the simulated target.

10. A method according to claim 9, further comprising:
    varying said controllable radar radiation impedance with a frequency corresponding to a target signal frequency of the simulated target; and
    evaluating a phase and an amplitude of the simulated target signal frequency.

11. A method according to claim 10, wherein the transceiver antenna unit has a movable reflector element for controlling the outgoing radar radiation in different directions, wherein the method further comprises:
    arranging the controllable radar radiation impedance to have an electric distance from a radiation receiving location of the unit vary with a motion of the reflector element; and
    evaluating the phase and the amplitude of the received simulated target signal to test the motion of the reflector element.

12. A device for testing the function of a car radar of FMCW type, which comprises:
    a transceiver antenna unit,
    means for feeding the unit with signals so that it transmits radar radiation,
    means for processing signals from the unit originating from reflected radar radiation received by the unit with a view to preparing radar target data,
    reflection means arranged in said unit in an actual radar beam path and having controllable radar radiation reflecting properties,
    means for controlling said reflection means to reflect radar radiation corresponding to a simulated target located at a distance from the unit, and
    means for evaluating radar target data corresponding to the simulated target.

13. A device according to claim 12, wherein said reflection means has a radar radiation impedance which is variable in a controlled manner.

14. A device according to claim 13, wherein said reflection means is a diode element, said control means being arranged to feed the diode element with an alternating current.

15. A device according to claim 14, wherein control means are arranged to feed the diode element with the alternating current having a variable frequency and/or a variable amplitude.

16. A device according to claim 12, wherein the transceiver antenna unit has a fixed reflector element and a movable reflector element of a Cassegrain type,
    wherein the reflection means is arranged between die fixed reflector element and the movable reflector element at one of die end of the fixed reflector element.

17. A method for testing a function of a car radar of FMCW type, comprising:
    providing a simulated target; and
    integrating the simulated target in an actual beam path located in a transceiver antenna unit of the car radar.

18. The method of claim 17, wherein providing die simulated target comprises providing a radiation reflection.

19. The method of claim 18, wherein said providing a radiation reflection includes providing a variable radar radiation impedance.

20. The method of claim 18, wherein said variable radar radiation impedance includes a diode.

* * * * *